United States Patent [19]

Finch

[11] 4,108,403

[45] Aug. 22, 1978

[54] VORTEX REDUCING WING TIP

[76] Inventor: Reginald Vernon Finch, P.O. Box 934, Coronado, Calif. 92118

[21] Appl. No.: 822,134

[22] Filed: Aug. 5, 1977

[51] Int. Cl.² .............................................. B64C 21/00
[52] U.S. Cl. .................................................. 244/199
[58] Field of Search ................ 244/199, 198, 91, 130; 416/223, 228; 415/DIG. 1

[56] References Cited

U.S. PATENT DOCUMENTS

| | | | |
|---|---|---|---|
| 2,123,096 | 7/1938 | Charpentier | 244/130 |
| 3,411,738 | 11/1968 | Sargent | 244/199 |
| 3,974,986 | 8/1976 | Johnstone | 244/199 |

FOREIGN PATENT DOCUMENTS 768,392  8/1934  France ........................ 244/91

*Primary Examiner*—Barry L. Kelmachter
*Attorney, Agent, or Firm*—Brown & Martin

[57] ABSTRACT

An airfoil tip is constructed to droop downward and extend aft of the trailing edge of the air foil structure and to include air foil configuration both chordwise and spanwise with camber in both the chordwise and spanwise directions and further including a vortex opposing twist in the chordwise direction.

7 Claims, 12 Drawing Figures

VORTEX REDUCING WING TIP

BACKGROUND OF THE INVENTION

The present invention relates to airfoil structures and pertains particularly to a airfoil tip for reducing vortex created thereby.

A considerable vortex is created at the outer tips or ends of conventionally constructed aircraft wings. The vortex is a result of the spilling of air from beneath the wing to the outer ends of the wings, and is most extreme under low speed, high load conditions. This vortex tends to considerably reduce the lift efficiency of the wing as well as increase the drag thereon. Numerous proposals have been made for reducing or eliminating the vortex. Some such proposals have been somewhat successful in reducing the vortex effect. However, there is still room for considerable improvement in the art.

Some prior devices, while reducing the vortex effect and increasing the lift, simultaneously increase the drag. This results in reducing the effective speed and efficiency of the plane.

It is therefore desirable that a wing tip be available which reduces or eliminates vortex and converts the vortex into usuable lift, as well as reducing the drag caused thereby.

SUMMARY AND OBJECTS OF THE INVENTION

Accordingly it is the primary object of the present invention to overcome the above problems of the prior art.

Another object of the present invention is to provide an improved wing tip which reduces vortex.

Another object of the present invention is to provide a wing tip which reduces vortex as well as reduces the drag resulting therefrom.

Another object of the invention is to provide a wing tip which increases the lift of the wing without a corresponding decrease in the drag thereof.

In accordance with the primary aspect of the present invention an airfoil tip is constructed to have a generally drooping configuration with an aft portion or tail portion extending aft of the trailing edge of the air foil of the wing with the wing tip having an airfoil section in its chordwise as well as spanwise directions.

The above and other objects and advantages of the present invention will become apparent from the specification when read in conjunction with the drawings, wherein:

FIG. 1 is a top plan view of the tip attached to a wing.
FIG. 2 is a sectional view taken on line 2—2 of FIG. 1.
FIG. 3 is a front elevational view of the wing tip.
FIG. 4 is a rear elevational view of the tip.
FIGS. 5 through 9 are sectional views taken on lines 5—5 to 9—9 respectively of FIG. 2.
FIG. 10 illustrates the airflow around the tip.
FIG. 11 is a graph of the coefficient of drag to coefficient of lift relationship.
FIG. 12 is a graph of the lift/drag relationship to angle of attack.

DESCRIPTION OF A PREFERRED EMBODIMENT

Figure 1:
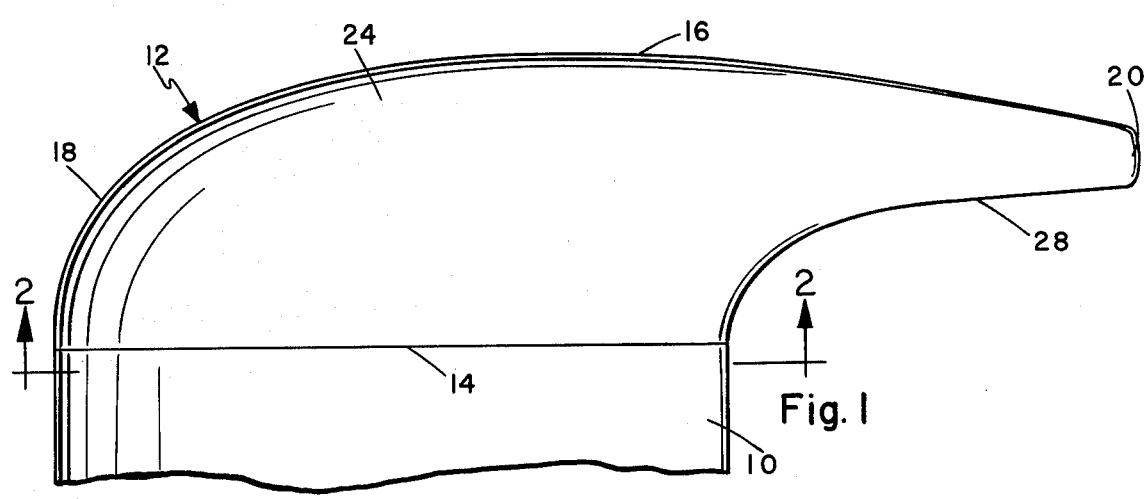

Turning first to FIG. 1, there is illustrated an aircraft wing 10 having a tip 12 in accordance with the invention attached to the outer end thereof. It will be understood that the present invention may be applied as well to helicopter rotor blades, propellers and other airfoils. The wing tip 12 includes an inner end 14 having preferably the same cross sectional configuration as that of the airfoil of the wing 10 to which it is connected. The wing tip extends outward and droops downward to the outer or outboard end thereof 16. The wing tip in the plan view sweeps backward from a leading edge 18 along the outboard end thereof 16 and converges or sweeps inward to terminate at a trailing end 20. The trailing end 20 extends considerably aft of the trailing edge of the wing 10. This aft extension as illustrated is greater than the one half the chord length of the airfoil of the wing 10 and may extend up to approximately ⅝ the length thereof.

Figure 2:
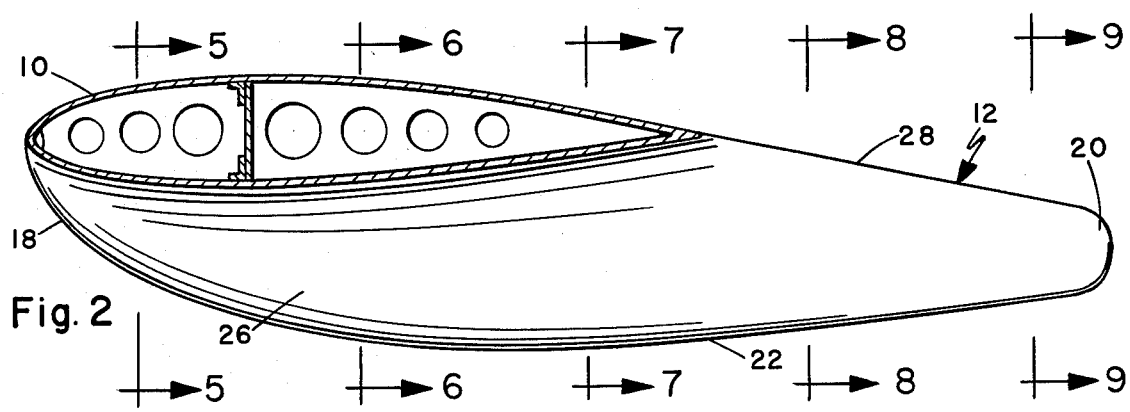
Figures 3, 4:
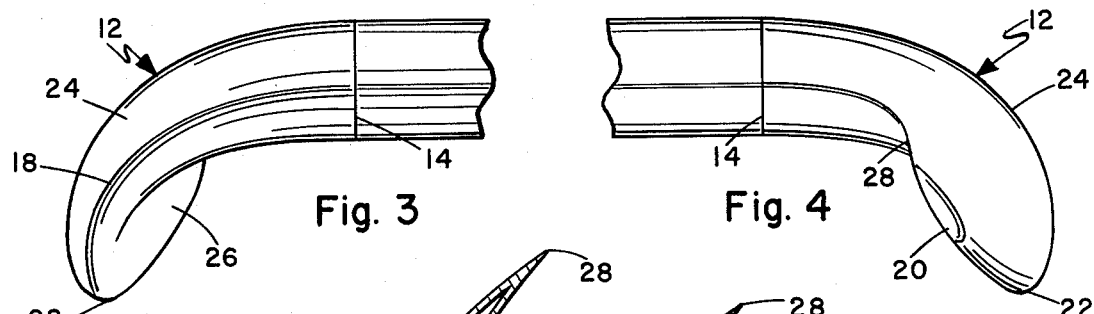
Figures 8, 9:
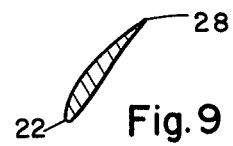
Figures 5, 6, 7:
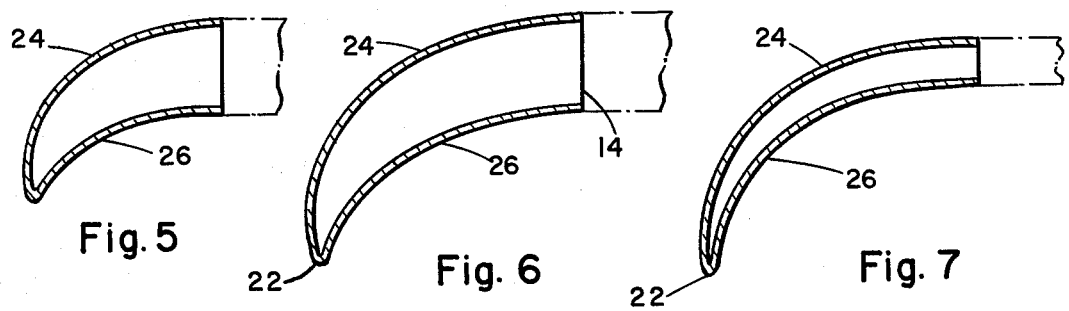

Turning now to FIGS. 2 and 3, it will be seen that the tip droops downward to a lower edge 22 with the downward displacement thereof exceeding the thickness of the airfoil of the wing. An upper surface 24 of the wing tip converges and sweeps downward to meet the lower surface 26 at the lower edge 22. An upper edge of the trailing portion 20 designated by the numeral 28 extends backward and downward to the end 20. This portion sweeps downward from the wing portion extending substantially therebelow.

Turning now to FIGS. 5 through 9 it will be seen that the tip in spanwise section has an airfoil configuration. This configuration provides a lifting foil such that the flow of air upward around it creates lift at the wing tip. The tip is also constructed to twist into an anti or counter vortex configuration. This opposes the formation and continued movement of the air into a vortex. The air will circulate around the aft portion of the wing tip causing a low pressure over the top aft portion thereof thus creating lift.

Figure 10:
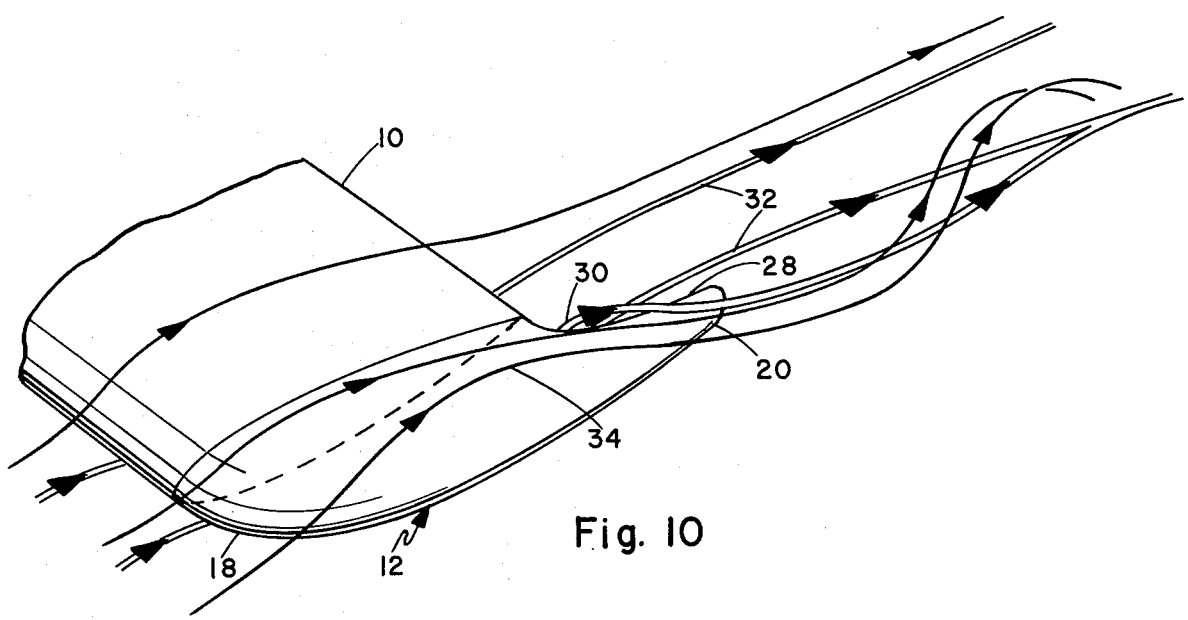

The tip acts somewhat as a fense catching air flowing outward under the wing, which would normally spill beyond the outer tip thereof, causing it to flow backward and circulate upward around the aft portion of the wing tip. This as explained above creates lift at the end of the tip. The tip additionally reduces the drag on the wing by reducing this vortex and creating a smoother flow of air over the wing tip. The flow of air past the tip is illustrated in FIG. 10.

The high air pressure airflow from below the wing normally rolls up around the tip to join the low pressure air above the wing, causing an upwardly and inwardly rolling vortex trailing behind the tip. With the extended tip as shown, a portion 30 of the high pressure flow 32 from below the wing rolls outwardly over the upper edge 28 of the tip extension. This deflects the low pressure flow 34 outboard and opposes the normal rotation of the vortex. The vortex is thus weakened and pushed outboard. The tip also has the effect of artificially increasing the wing aspect ratio and thereby increases its efficiency.

Figure 11:
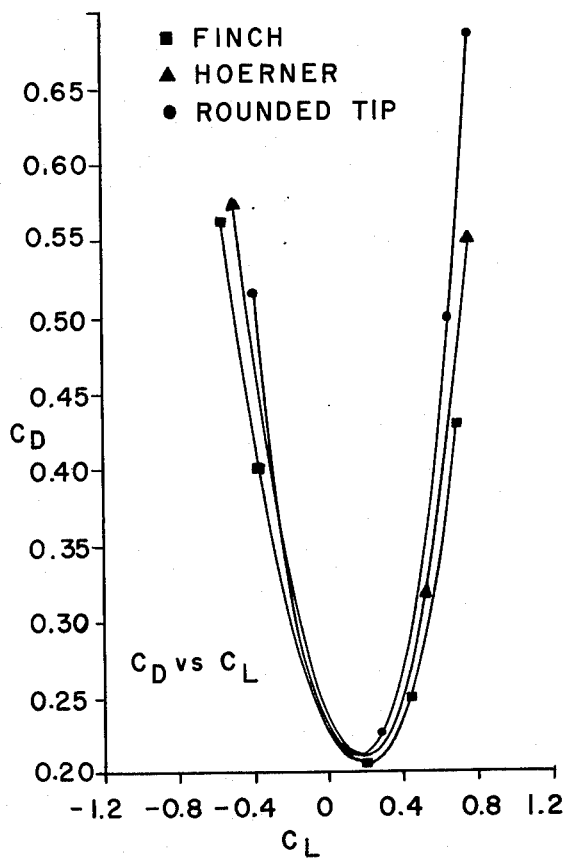
Figure 12:
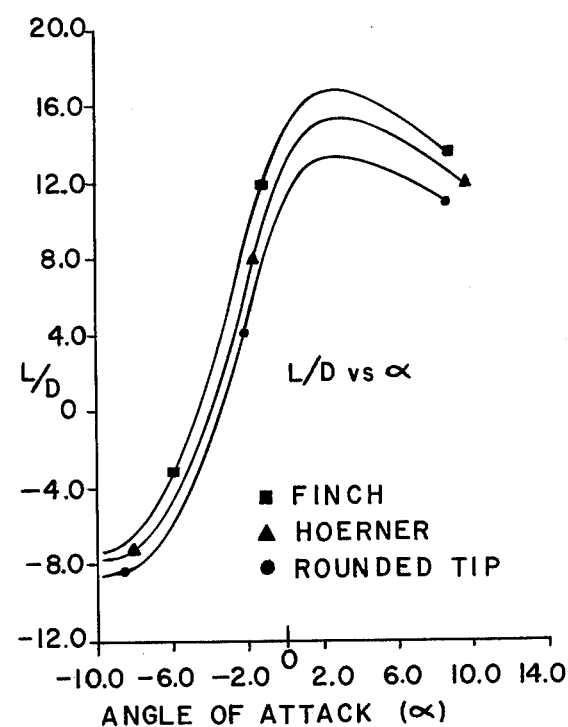

Extensive wind tunnel tests were conducted for comparison of the effectiveness of the present wing with that of a standard wing and that of the so-called Hoerner tip. The results as illustrated in the curves of FIGS. 11 and 12 indicate a substantial increase in the lift of the present wing (Finch) as compared to either the standard wing (rounded tip) or the Hoerner wing. The tests also indicate the reduction in the drag at both lift off and cruising speeds. This tip has the effect of increasing the lift of the airfoil and thereby reducing speeds for both landing and take off, and the distance necessary for both landing and takeoff. This increases the safety factor of the aircraft. Additional such tips applied to larger aircraft would have the effect of reducing or eliminating the typical vortex created thereby which is dangerous to smaller aircraft. The tests indicate a reduction in drag which also would increase the cruising speed of the aircraft.

As illustrated in FIG. 11, the coefficient of drag for the present invention (Finch) is much less than that of either the Hoerner or rounded tip for a given coefficient of lift, such as at cruise speed. This is also found to be true at lift off and landing speeds.

The lift to drag ratio (L/D) as illustrated in FIG. 12 is greater for the tip of the present invention for a given angle of attack than for either the rounded tip or the Hoerner tip. This same relationship is found to hold true at cruise speed as well as landing and takeoff speeds.

Having described my invention, I now claim:

1. A counter vortex airfoil tip for countering the vortex created by relative movement between the airfoil and a body of air, said tip comprising:

an inboard end for mounting on the outer end of an airfoil, the inboard end having a configuration substantially conforming to the profile of the airfoil to which said tip is mounted, said airfoil tip defined by upper and lower surfaces extending outward and curving downward and extending aft at the outboard end thereof to a trailing tip extending approximately one half the length of the inboard end behind the trailing edge of the inboard end, said upper and lower surfaces joined at a leading edge that extends outward and curves downward to a lower edge that extends below the lower surface of said inboard end from the leading edge thereof to the trailing tip, and said airfoil tip having an airfoil configuration in both its chordwise and spanwise direction.

2. The airfoil tip of claim 1, wherein said tip has a vortex opposing twist therein.

3. The airfoil tip of claim 2, wherein said twist is defined by the lower surface of said airfoil tip.

4. The airfoil tip of claim 1, wherein said lower edge extends below the lower surface of said inboard end at the thickest portion of said end at least the thickness of said end thereat.

5. The airfoil tip of claim 1, wherein said trailing tip is displaced inward from the outboard end of said airfoil tip.

6. The airfoil tip of claim 5, wherein said airfoil tip converges toward said trailing tip.

7. The airfoil tip of claim 6, wherein said trailing tip is below the lower surface of said airfoil when said airfoil is at a zero angle of attack.

* * * * *